Figure 1:
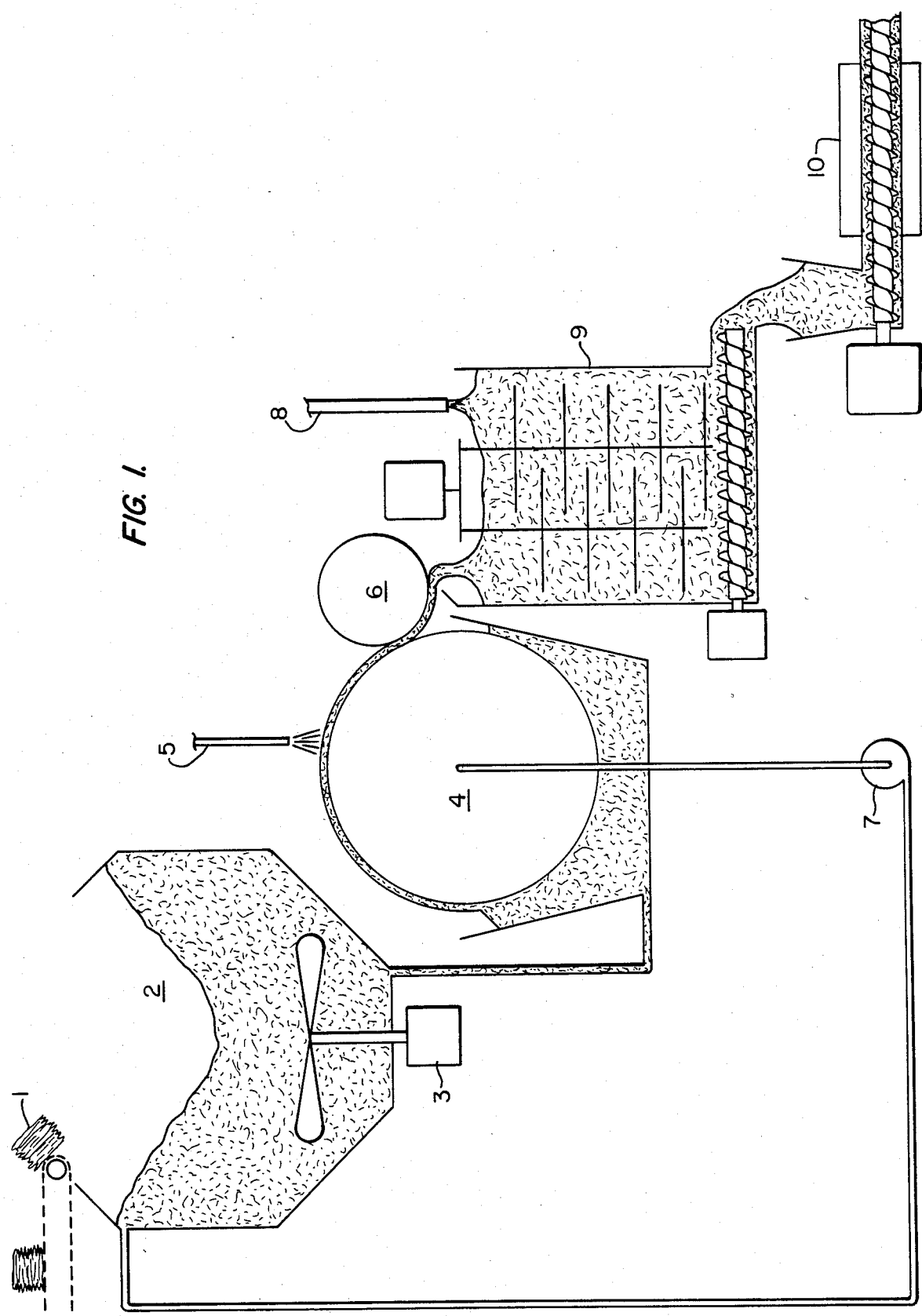

United States Patent [19]

Gåsland

[11] Patent Number: 4,508,595

[45] Date of Patent: * Apr. 2, 1985

[54] PROCESS FOR MANUFACTURING OF FORMED PRODUCTS

[76] Inventor: Stein Gåsland, Dreyersvej 29, 2960 Rungsted Kyst, Denmark

[*] Notice: The portion of the term of this patent subsequent to Mar. 22, 2000 has been disclaimed.

[21] Appl. No.: 477,332

[22] Filed: Mar. 21, 1983

Related U.S. Application Data

[63] Continuation of Ser. No. 245,753, Mar. 20, 1981, Pat. No. 4,377,440, which is a continuation of Ser. No. 42,222, May 24, 1979, abandoned.

[30] Foreign Application Priority Data

May 25, 1978 [SE] Sweden .............................. 78056934

[51] Int. Cl.³ .............................................. D21H 3/02
[52] U.S. Cl. .................................... 162/158; 162/145; 162/146; 162/147; 162/168.1; 162/174; 162/177; 162/178; 162/183; 162/218; 264/175; 264/176 R; 264/204
[58] Field of Search ............... 162/101, 145, 146, 147, 162/158, 168.1, 174, 177, 178, 218, 183; 264/165, 175, 176 R, 204

[56] References Cited

U.S. PATENT DOCUMENTS 570,361 10/1896 Archbold ........................... 162/175
3,895,998 7/1975 Haywood et al. .................. 162/145

FOREIGN PATENT DOCUMENTS 1371096 10/1974 United Kingdom ............... 162/177

Primary Examiner—Peter Chin
Attorney, Agent, or Firm—Finnegan, Henderson, Farabow, Garrett & Dunner

[57] ABSTRACT

A method of making a shaped cellulosic paper or paperboard, comprising the steps of:

(a) diluting cellulosic fibers with water to form an aqueous suspension of less than 10 percent by weight cellulosic fibers;

(b) agitating the aqueous suspension of cellulosic fibers until the fibers become separated from each other and swollen;

(c) dewatering the aqueous suspension to at least 20 percent weight cellulosic fibers;

(d) preparing a homogeneous, plastically formable material by adding to the suspension sufficient hydrocolloid to bind substantially all of the water in the material to prevent the water from bleeding out during subsequent shaping and to prevent the fibers from flocculating, and by kneading the material, said material containing water in the range of from about 50 to about 90 percent, fibers in the range of from about 8 to 49 percent, and hydrocolloid in the range of from about 1 to about 20 percent, by weight;

(e) shaping the material by extrusion, injection molding, rolling, pressing or drawing, and (f) bonding the solids of the material by drying the shaped material.

2 Claims, 19 Drawing Figures

PROCESS FOR MANUFACTURING OF FORMED PRODUCTS

This is a continuation of application Ser. No. 245,753 filed Mar. 20, 1981, now U.S. Pat. No. 4,377,440 issued on Mar. 22, 1983, which was a continuation of application Ser. No. 42,222, filed May 24, 1979, now abandoned.

This invention relates to a process for manufacturing formed products, and particularly products of wood fibers to be formed from water dispersions of such fibers.

The traditional methods for the production of wood fiber products such as
- the thinnest: "paper"
- the intermediate type: "paper board" and
- the thickest: "particle board"

involve a dispersion of the cellulose pulp or wood pulp or the wood particles in water at very low solid content. To achieve such even distribution of the fibers that paper or board of acceptable quality can be produced flocculation of the fibers has to be avoided, which makes it necessary to use so much water that its weight is about 200 times that of the fibers themselves. Afterwards this water has to be removed
- first by drainage through a wire
- thereafter by pressing
- and finally by evaporation with heat.

Paper, paper board and related products have now been produced in basically this way for almost 180 years. Handling of the big amounts of water and the necessity of cleaning of the effluent, which cannot be recirculated back into the process, have made the paper industry into giant units which have to utilize a minimum of 80% of production capacity—day and night the year round—in order to pay the very high capital costs.

The reason why wood fibers are so suitable to produce paper and related products is their innate property of producing chemical bonds—hydrogen bridging—between each other when water evaporates and dry content passes about 70%. This imparts to the ready products their mechanical strength, while strength can be further improved by the addition of binders. The most common binder is the hydrocolloid starch. The use of binders is becoming gradually more important as the industry is using gradually more waste fiber, which is recirculated back to the industry from the community, because the recirculated fibers do not possess the same strength potential as virgin fibers. Binder can be added at the wet end of the manufacturing process to become homogeneously mixed in between the fibers or it can be applied at the surface after web formation. Both methods, however, have their limitations:

By addition at the wet end, the binder has to adhere to the fibers at the point in the process where there is the highest quantity of water present, which means that it is necessary to use expensive surface active binders to prevent their leaking out of the system together with the water. Also other additives cannot give their optimum efficiency when added at the wet end, because of the bad retention and also because all reactions are difficult to carry through at these low concentrations.

Surface applications are efficient to improve the surface characteristics of paper and board. The most common method for strength improvement is that of size press treatment by which the paper passes through a size press with starch solution after the paper has been dried to a dry content of about 95%. Size presses are only capable of handling thin low viscosity liquids so that the binder has to be broken down in viscosity which unfortunately reduces the strength potential of the binder. It is also not possible to run with higher binder concentrations in the size press than 13%. The rest of the solution is water, which penetrates into the paper so that it becomes necessary to carry out the expensive drying by heat a second time. By pressing before drying it is usually possible to reduce the water content to 2 tons per ton of ready paper, and in the size press it is normal to add about half a ton of water per ton of ready paper, which means that the total amount of water which has to be evaporated is about 2½ times as much as the paper produced.

Because of the above limitations it is not normal to use more binder than about 1/20 part of the paper produced.

From the patent literature it can be seen that the problem of the big amount of water has been addressed along two different lines:

Modest Increase of Concentration

1. It is said that by foaming the water amount can be reduced to about 100 times the amount of fibers.

2. Swedish Pat. Nos. 355615, 366787, 362458 and 385029 describe so-called high consistency formation, by which it is said that the water can be reduced to 25 times the weight of the fibers. By higher consistencies the distribution of fibers are not even enough.

Completely Dry Web Formation

Formation of cellulose fibers without water is used for the production of so-called nonwoven. See, for instance, U.S. Pat. No. 3,575,749. In this way, however, the great advantage of cellulose fibers above other fibers to link by hydrogen bridging is lost, so that it is necessary to use large amounts of synthetic binders such as styrenbutadien or acryllics.

Industrial production between the two extremes—very low consistency and completely dry production—has not been achieved before the present invention.

By the present invention the problems of the big amounts of water and the limitations in binder addition have been solved in a new way and a process for the manufacturing of formed products from dispersions of fibers in water has been accomplished, which process is characterized by addition of one or more hydrocolloids to the dispersion carried out after possible de-watering and before formation.

Those fibers, which according to the invention, are most suitable are fibers from cellulose or ground wood. Also inorganic fibers such as glass fibers, synthetic fibers such as polyester, polyamid or acryllics or mineral fibers such as asbestos may be used.

According to the invention it is suitable to use as hydrocolloid starch, starch derivatives, dextrins, polyvinylalcohol, cellulose derivatives such as carboxymethylcellulose or hydroxyethylcellulose animal protein such as casein, vegetable protein such as soya, vegetable gums such as guar gum or locust bean gum, alginate, synthetic hydrocolloid such as polyacrylamide or flour from different origin such as wheat, oat, rye, barley, corn etc. or from tubers such as potatoes or tapioca.

The hydrocolloid could be added after gelatinization in water or only dispersed in water or any other liquid.

Formation according to the invention can be done at different temperatures and also at elevated pressures. Expansion can be accomplished during the formation by simultaneous development of gas or steam.

Formation according to the present invention can be done by extrusion or injection-moulding by machinery similar to those in the plastic industry, by coating with machinery similar to those in the plastic industry, in the paper and board industry and in the industry for production of building elements such as gypsum boards, or through rolling, pressing or drawing with machinery similar to those used in the metal industry.

The invention is particularly advantageous for those concentrations of fibers and colloids, which appear from the curves on FIGS. 7–19, to be described below.

Addition of hydrocolloid in such an amount to completely bind the water turns the suspension into a surprisingly homogenous plastic cohesive paste of fibers, water and colloid. The properties of this paste are completely different from the properties of those fiber dispersions which are normally used for the production of fiber products. If such a traditional fiber dispersion is exposed to extrusion, injection moulding, rolling or pressing, a de-watering is instead accomplished and in the cases of extrusion and injection moulding the nozzles are being plugged by de-watered fiber bundles.

It will appear from the experiments to be described below that it is possible to reduce the amounts of water present during formation to about 2 times the dry content which indeed is a considerable improvement compared to 200 times by traditional production of paper and paper board.

Fortunately, the colloid is both—a process aid during formation by binding the water and preventing the fibers from flocculating and also—a functional aid for the ready product by giving strength and rigidity.

For the complete binding of water more hydrocolloid is needed than what is normally used as binder by traditional methods. As will appear from the experiments to be described below a normal amount of colloid is about $\frac{1}{3}$ of the amount of fibers. The invention thus eliminates those limitations for addition of binders which are mentioned in the introduction above.

The invention shall be further described below with reference to the attached FIGS. 1–19. The figures illustrate examples as the invention obviously can be performed in many different types of machinery and the combinations between fibers and colloids are also infinite.

FIG. 1 illustrates how fiber 1 can be dispersed in water in a hydro pulper 2 equipped with a strong agitator 3. The agitation separates the different fibers from each other. The preparation of the dispersion can be divided into or completed with such in themselves known steps as disintegration, deinking, defibration and refining. The dispersion is brought to the filter 4 for de-watering also by methods which in themselves are wellknown. The net-supply of water to the process may conveniently be added at the filter in order to further clean the fibers before they are—if desired—further concentrated by pressing 6. The water separated from the filter may be recirculated to the pulper possible after cleaning. Impurities which arrive with the fiber may be taken away be different in themselves well-known separation processes in the pulper itself or on the course to the filter. After dewatering to the desired concentration the hydrocolloid is added 8. The hydrocolloid is mixed into the fiber suspension by strong kneading through which a paste ready for formation is prepared. Formation may be done in a separate equipment or possibly through extrusion directly from the kneading apparatus. Formation temperature can be controlled 10.

Figure 2:
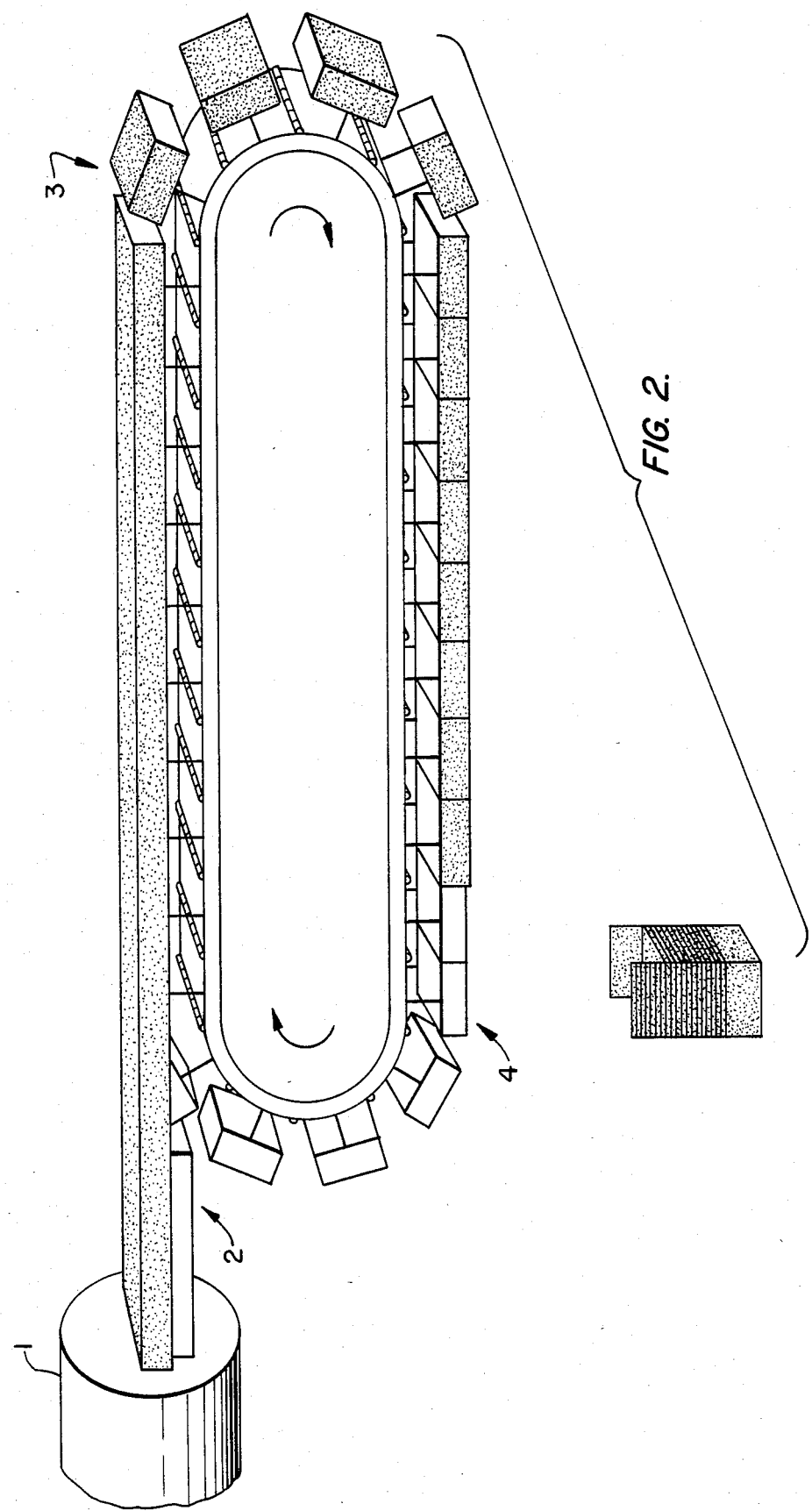

FIG. 2 illustrates formation by an extruder 1. The temperature in the extruder is controlled by heating or cooling. It shall later be shown that elevated temperatures give the possibility of formation at higher concentrations. After formation the first drying may be performed by radiation or convection 2, after which the extruded profile is laid down onto heated forming boxes. The hood above the rotating forming boxes may be used in order to recover the heat in the air used for drying, although it is not included on the drawing. When the forming boxes are moved away from each other 3, the web is divided into desired lengths and when the drying is completed the produced articles are loosened from the forming boxes, for instance, by the aid of pressurized air 4. Before new paste is laid onto the forming boxes they may be cleaned and prepared in other ways. FIG. 2 illustrates extrusion of a profile, but it is of course also possible to use a wide flat extruding nozzle in order to produce flat sheets which afterwards can be dried and converted by similar machinery as for traditional types of board.

Figure 3:
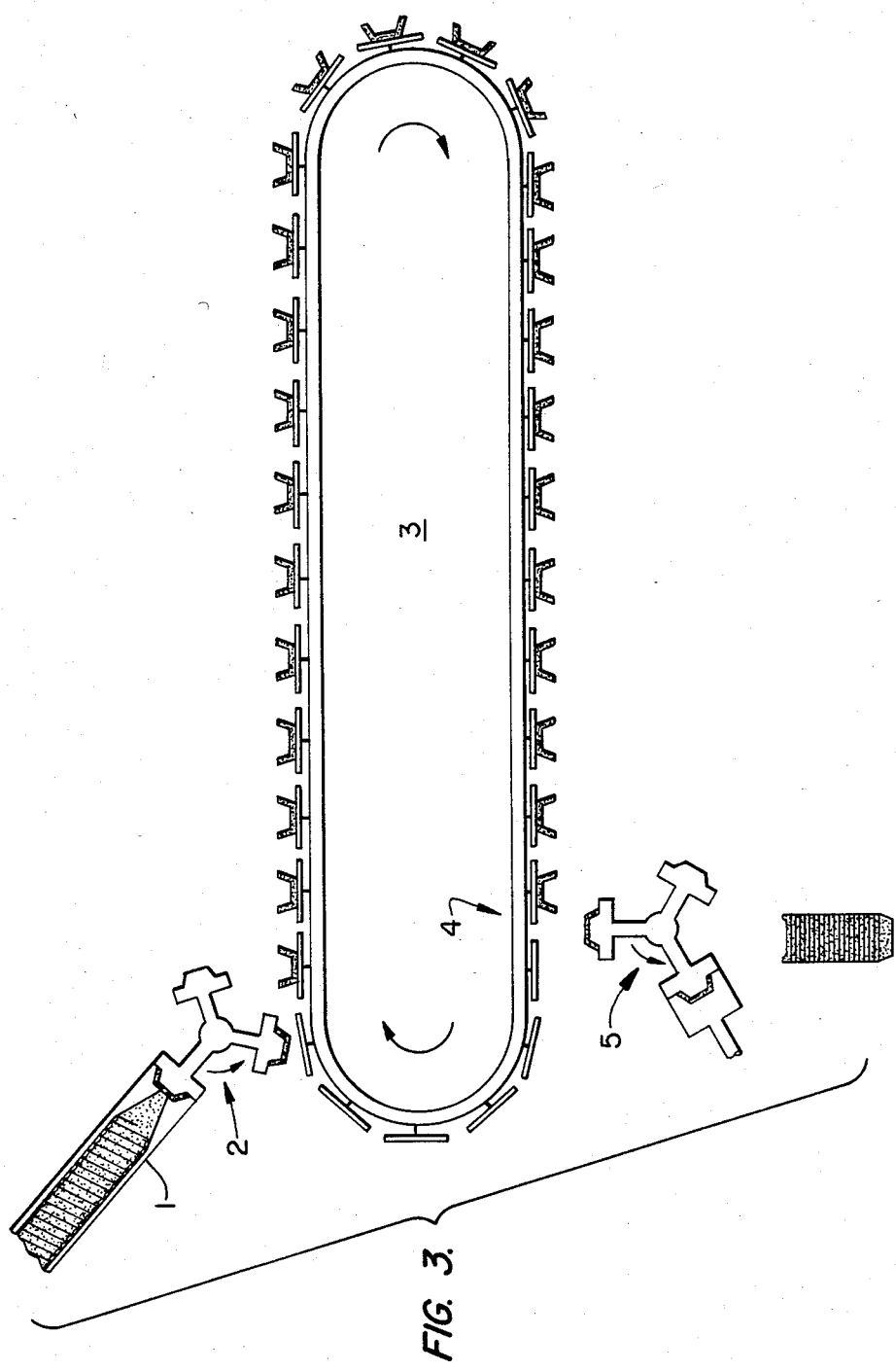

FIG. 3 illustrates intermittent extrusion into moulds. In the plastic industry this is called injection moulding. The upper part of the mould is permanently connected to the extruder 1 and the lower part 2 is also used to transfer the billets to the drying equipment 3. A hood may be used above the drying equipment in order to recover heat, although it is not included in the drawing. The billets are loosened from the drying equipment at 4, for instance, with pressurized air. During the drying the billets have shrunk, so that they have to be pressed into correct caliber at 5.

It is possible to produce porous products by incorporation of additives which release gas—usually hydrogen, carbondioxide or nitrogen—or by performing the extrusion with paste at temperatures higher than 100° C. against normal air pressure after the extruder. The expansion can also be accomplished through foaming. Packaging materials with a hard outer surface and a soft shock-absorbing inside may be produced by keeping the two sides of the mould at different temperatures. Sandwich-constructions with expanded center and compact surfaces may be produced by keeping both surfaces cool during formation while the center maintains its high temperature. The basics from manufacturing of foamed plastics can be applied.

Figure 4:
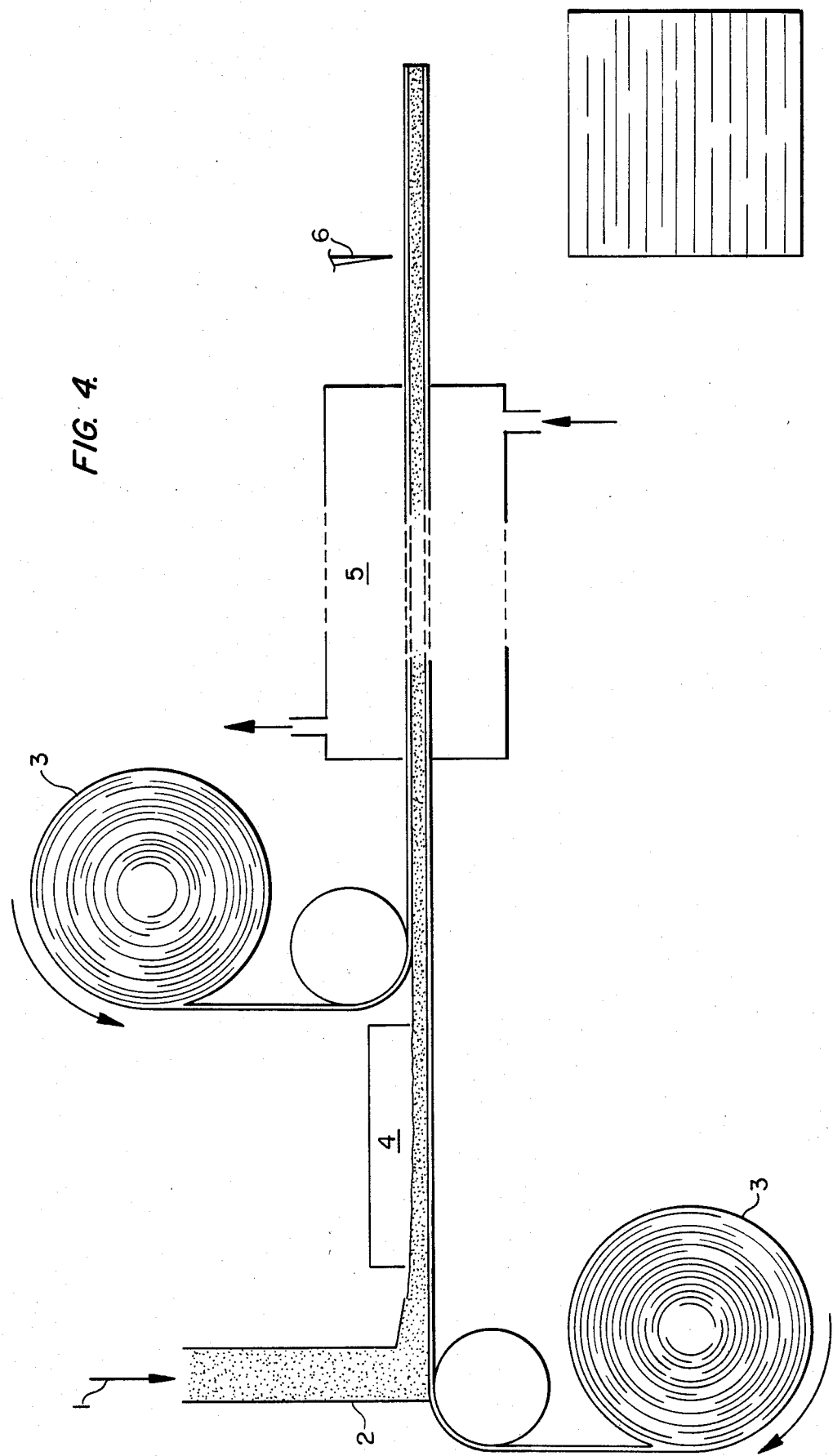

Building elements such as boards may be produced according to the invention as illustrated on FIG. 4. The paste 1 arrives from a headbox 2 and is spread out on a forming board 4 between two covering layers 3, constructed, for instance of paper. The paste may possibly be predried on the forming board, for instance by the air of radiation. The main drying is accomplished in a long drying oven 5 during which the hydrocolloid migrates together with the water toward the two surfaces and accomplishes gluing towards the covering layers. Finally the board is cut into suitable sizes 6. By expansion as described above the desired compromise between strength, heat-insulation and sound-insulation can be obtained.

Figure 5:
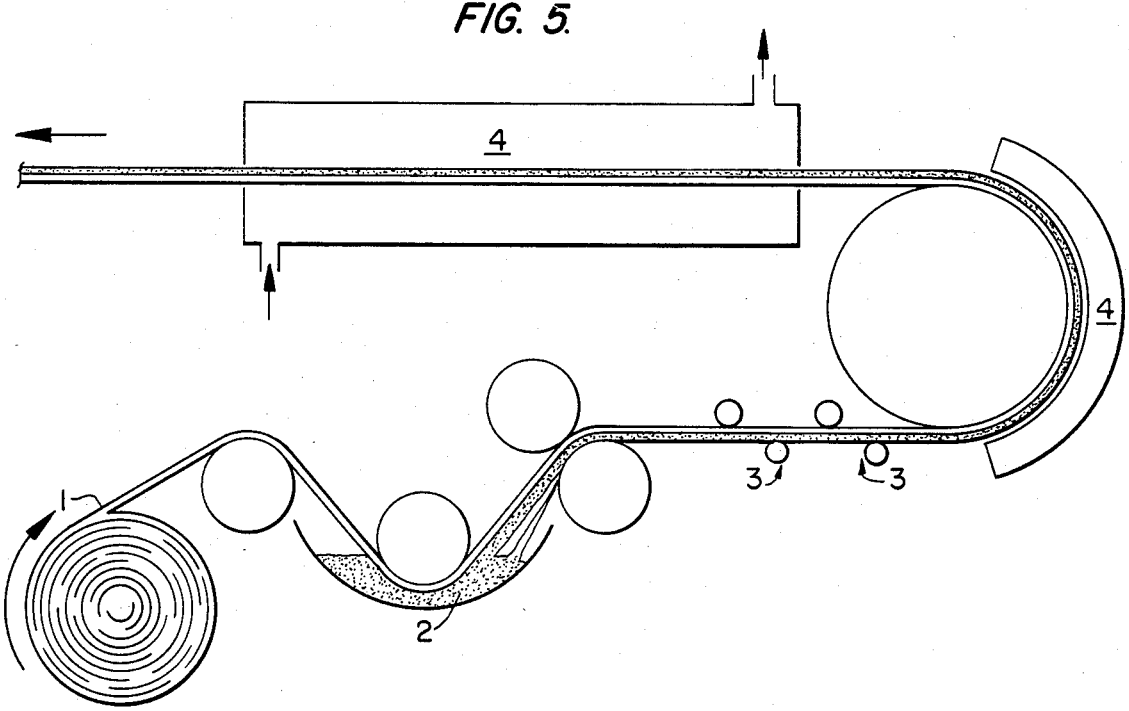

FIG. 5 illustrates an example of coating with paste 2 prepared according to the present invention. It is thus possible to combine the fibrous product, for instance, with a film of plastic 1. After application the paste is levelled out 3 and dried 4.

A flat web prepared according to the present invention may, when it is still moist and therefore flexible, be laid onto moulds for manufacturing of disposable plates 5 and the like.

Articles manufactured according to the present invention may also be combined with other materials after drying, for instance, by applying decorative films or decorative printings, and on top of this may also be applied a clear lacquer, such as of acryllic, PVC or polyurethane. A box manufactured according to the invention may be covered with nice looking paper or lined on the inside with waterproof materials.

The amount of colloid needed to completely bind the water according to the present invention is higher than the amount of colloid used for strength improvement according to traditional manufacturing methods as indicated above. At a first view this high amount of binder may be interpreted as a disadvantage of the present invention because additives are commonly considered to increase costs. For the present invention, however, this is not the case. This is best explained by reference to the fact that the most common colloid starch costs about the same as cellulose. If then the cellulose needed by other manufacturing methods to achieve the same strength is substituted with starch and cheaper fibers of lower strength, the raw material cost per ton is reduced and the starch compensates for the lower strength potential of the cheaper fibers. The only type of paper or board which in stiffness and rigidity may be compared to products manufactured according to the present invention is laminated board, which is made in two manufacturing steps: first production of the individual paper layers and then usually in another mill to glue these layers together. Experimental sheets made according to the present invention in the basis weight area 400–1200 grams per $m^2$ were compared by measurement of stiffness with commercially laminated board. It then appeared that only the very most expensive types of laminated board were able to show the same stiffness at equal area weight as the present invention gave with old newspapers as fibers and normal corn starch as colloid. To achieve such a stiff laminated board it is necessary to use papers made from virgin kraft pulps and these papers cost about $300 per ton. When using the present invention it is possible to achieve the same stiffness by extrusion of a paste composed of 23% newsprint waste at a cost of about $40 per ton and 8% starch (see FIG. 11) at about $300 per ton, which means that the average raw material cost is about $100 per ton. It is therefore possible with the present invention to reduce raw material cost to about $\frac{1}{3}$ of the normal cost with traditional methods—and to maintain rigidity.

Corrugated board, which is a good method to produce packaging materials, was invented by Albert L. Jones in 1871, U.S. Pat. No. 122,023. The rigidity of the board compared to the amount of material used has been improved by making the center hollow and surfaces compact. The most important property is the ability of high piling height of the filled corrugated boxes. This is accomplished by having the corrugations run vertically in the walls of the boxes and also by using stiff paper in the center corrugated layer—the fluting medium. By the production of the base papers—the fluting for the center and the two liners for the surfaces—it has, however, not been possible to carry through this orientation of the stiffness. A paper machine is able to orient the fibers somehow in the machine direction to achieve orientation of the stiffness in this direction but not in the cross direction. At corrugated board mills the papers are handled in continuous webs and the corrugations therefore unfortunately are in the opposite direction of the highest stiffness of both fluting and liners. This disadvantage is further amplified by the fact that the corrugated board mills, by bending the paper to make flutes, destroy some of the stiffness, which the paper mills endeavoured to incorporate into the fluting.

Figure 6:
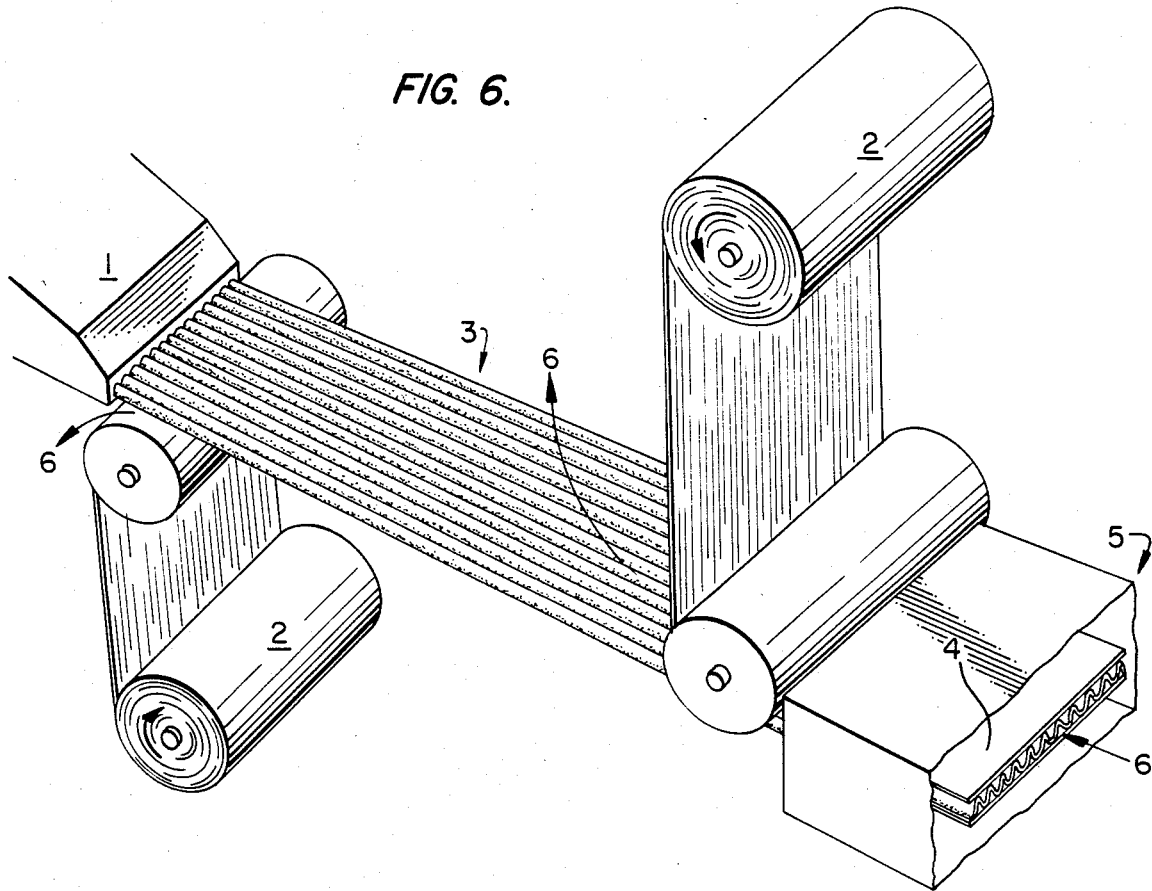

These disadvantages are eliminated if the present invention is used for production of corrugated board, for instance, as illustrated on in FIG. 6:

The fibers in the liners 2 are oriented in the same direction as the corrugations.

The fluting is extruded as a paste according to the invention from an extruder, which has a profile to achieve the desired corrugations and the fibers can in this way to some extent be oriented along the corrugations.

The stiffness of the fluting is not destroyed by bending after it has been formed.

Before the two liners 2 have been applied there may be a predrying by radiation 3. The main drying is carried out in a long oven in a similar way as by traditional production of corrugated board 4. By traditional production the corrugations are in cross direction whereas by the present invention they may be in machine direction as shown in section 5. If the drying oven is in an inclined position the evaporated steam may be carried away by natural convection 6.

During the drying the colloid migrates in the fluted layer together with the water out towards the liners and accomplishes adhesion between the flutes and the liners so that the use of adhesive may be dropped. Another very important improvement is the possibility of achieving high wet stiffness by the addition of wet strength aids, because the amount of starch in the fluting layer is higher than traditionally and the wet strength aids are more efficient on starch than on cellulose. Finally the commercial aspects should not be forgotten. The raw material cost for fiber products according to the present invention is about $100 per ton as shown above. The corrugators are today buying their base papers at prices in the line of $400 per ton.

The corrugated board may according to the present invention be manufactured in many different ways from that illustrated in FIG. 6. It is, for instance, possible also to make the liners according to the invention from extruders making a flat web.

The present invention is, because of the high amount of binder, particularly interesting for production of articles where rigidity and appearance more like wood than paper increases the marketing value, such as, for many different packaging purposes. The invention is also particularly interesting for production of hollow articles, as this is awkward with the traditional methods, where it is necessary to start from flat sheets. On the raw material side the invention is particularly interesting for the recirculation of newsprint waste. This waste paper is, because of its low potential strength and slow drainage, not attractive in other methods where waste fiber is used and therefore cheap. It will be shown below that with newsprint waste it is also possible to use less colloid to achieve complete binding of water than with longer fibers.

In those cases where a more tough and flexible end product is required the hydrocolloid may be combined with a synthetic binder, for instance latex of styren-butadien, acryllic or vinylacetate.

To prevent penetration of water, natural and synthetic resins may be added. To increase wet strength, the efficiency of such resins are ureaformaldehyde and melaminformaldehyde is remarkably good. Other additives may be used as fillers, such as clay and chalk and pigments such as titaniumdioxide. Further, dye and fire retarders may be added.

The drying rate may be improved by adding fillers which make the paste more porous or by adding products which absorb water, such as burned gypsum or cement.

In those cases where a still more rigid product is needed than by the use of only hydrocolloid the hydrocolloid may be combined with other binders, for instance, cement.

To this point in the description only fibers of wood origin have been mentioned. The invention is, however, applicable also with other types of particles dispersed in water. By traditional production of ceramics, china and cement products the ability of some materials such as that of clay to bind water is utilized in order to obtain a homogeneous paste, which may be formed. By addition of hydrocolloid according to the present invention such methods of forming are not any longer limited to those minerals, which in themselves bind water. It will thus be possible to make articles of quite new compositions. The method may in the future obtain great importance for the production of briquetted firing material particularly briquetted fuel formed by using the present invention to transfer water dispersions of powdered coal or other cheap combustible material into pastes, which are then formed to brickets or other shapes suitable for distribution and automatic heating.

Trials have been performed with an injection moulding machine type Demag Stübbe S 55 d, which is normally intended for plastics. The machine had a nozzle with diameter of 3 mm. No difficulties were encountered by extrusion of a string of paste out of this nozzle and into a mould with a flowing discharge of 250 mm and a material thickness of 2 mm. By leaving a narrow fissure of 0.3 mm between the two parts of the mould a film was extruded which after drying had a thickness of 0.2 mm. It appeared that the necessary precautions for troublefree injection moulding and film extrusion were:

Completely binding of the water in the paste. With insufficient amount of hydrocolloid a dewatering occurred in the nozzle which left it plugged with fiber bundles.

Acceptable flowability. With too high concentrations boundaries were detected inside the formed articles.

The experimental products produced were in appearance—particularly with regard to stiffness, rigidity and rattle—somewhere between wood and stiff paper board.

In order to establish the limitations in concentrations during formation many experiments were performed with some different types of dispersed particles and colloids. The minimum and maximum amount of colloid to make the invention practical was measured at the laboratory at different fiber concentrations. For this work two criterions were chosen:

Criterion for maximum amount of hydrocolloid:
A Haake consistometer was used. This is a viscosimeter which measures the resistance for flow through a 2 mm hole drilled in a piston. Temperature of the paste is controlled by a thermostat. The viscosimeter is used in the plastic industry for measuring of viscosity of thermo-plastics after melting. The viscosity is calculated from the equation $$\eta = G \cdot t/s = K$$

where
$\eta$ = viscosity in Pascal seconds,
$G$ = load in kp,
$t$ = time in seconds,
$s$ = measuring distance in mm,
$K$ = constant for the apparatus with hole of 2 mm = 2.5.

As criterion 1000 Pascal seconds were chosen. This is in the plastic industry considered quite high but not difficult to extrude.

Criterion for the minimum amount of hydrocolloid:
The same Haake consistometer was used to establish the amount of colloid needed to obtain complete binding of the water. The first sign of incomplete binding (synaresis) was a glossy surface of free water on the surface of the extruded string.

By using these two criterions, the graphs shown in FIGS. 7–19 were made. Fiber concentration is plotted along the horizontal axis and colloid concentration along the vertical axis—both in weight percentages of the entire paste. The difference up to 100% is water. The lower line gives the minimum criterion and the higher line the maximum. The two lines combine to an angle and the invention is practicable within this angle.

Figure 8:
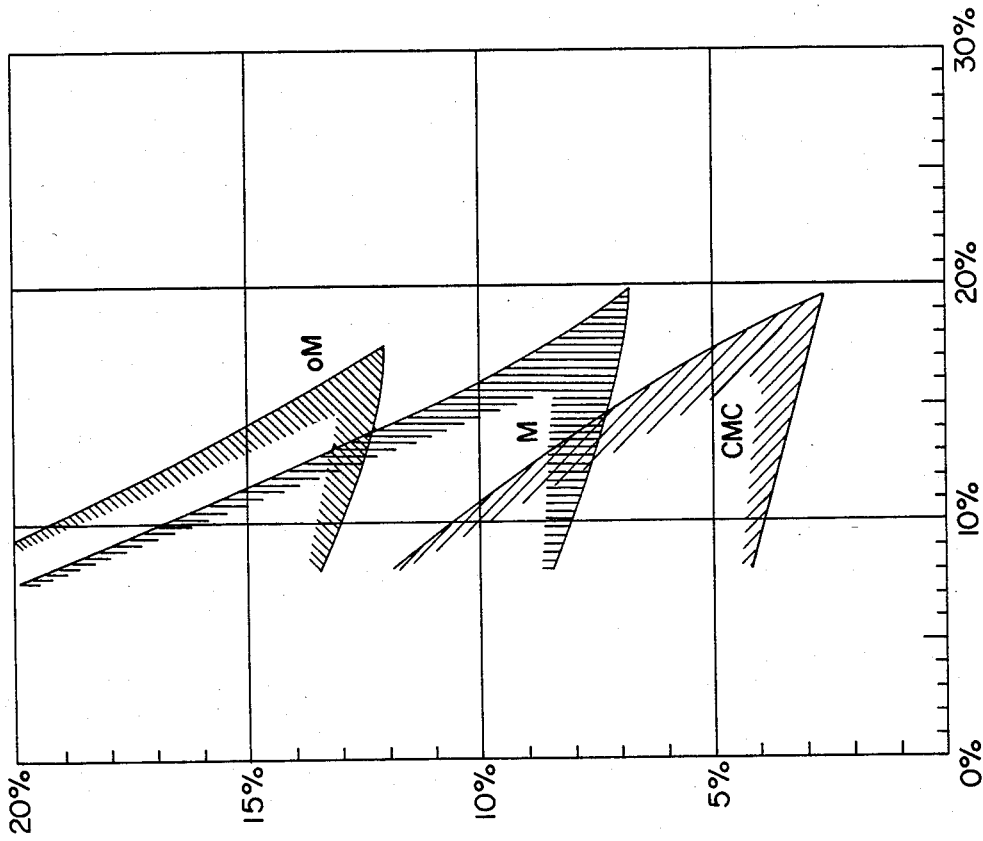
Figure 7:
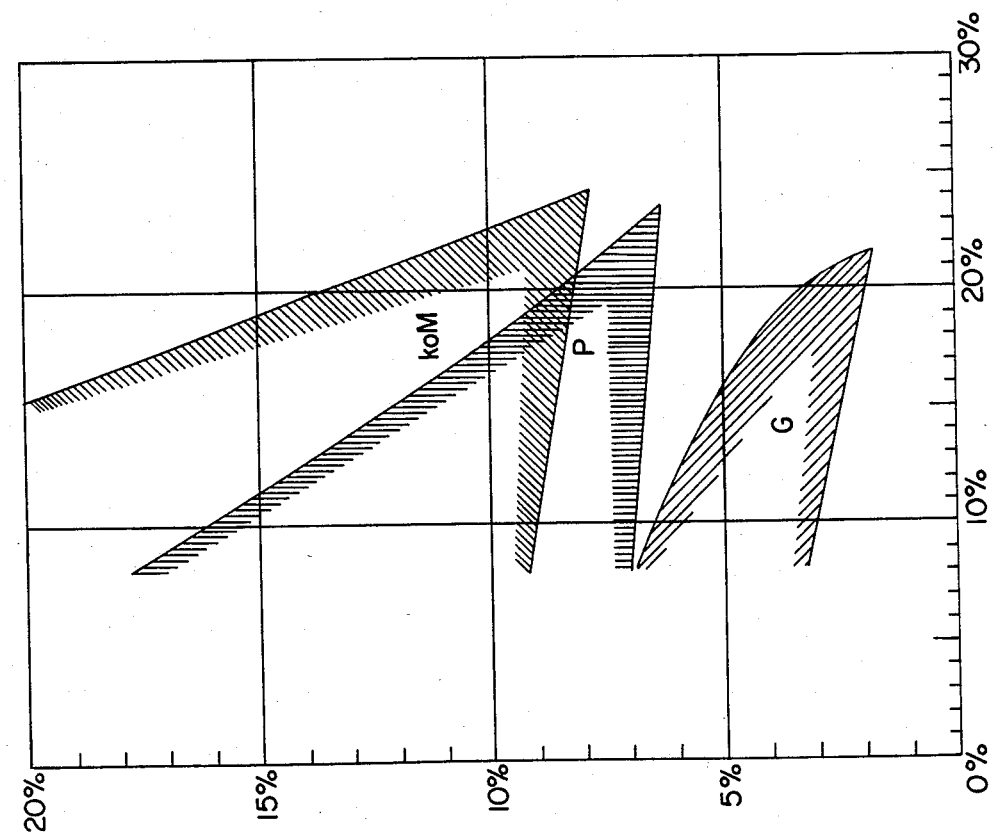
Figure 9:
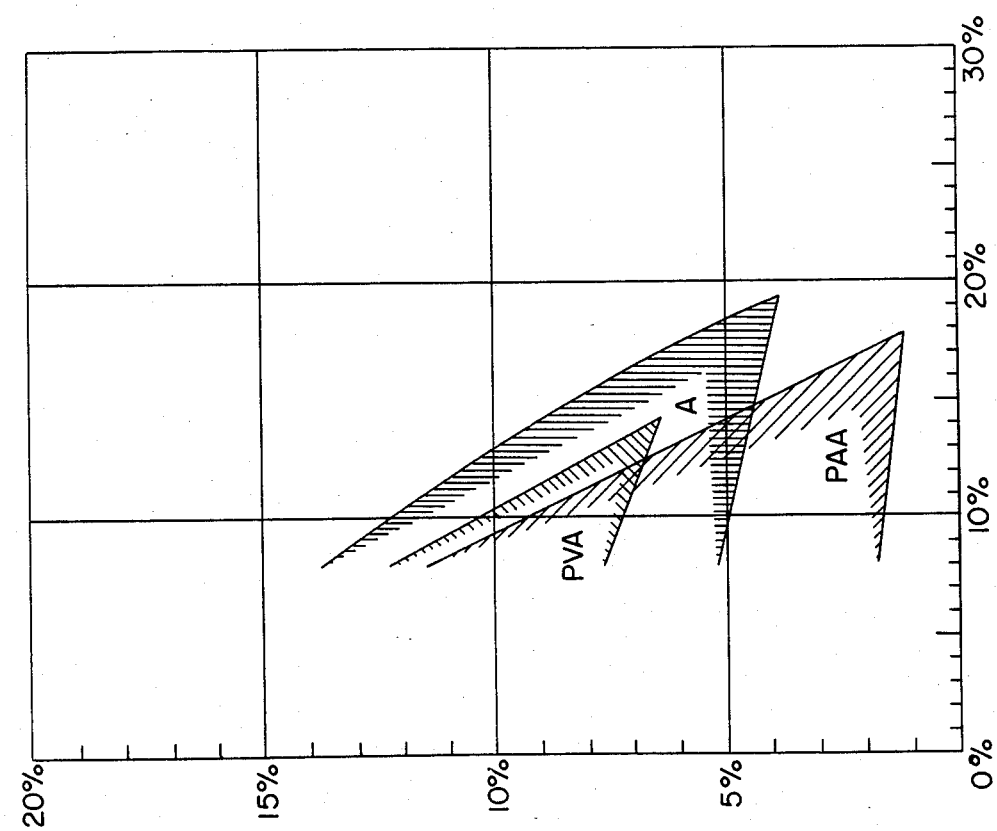

For the experimental data shown on FIGS. 7–9 the fiber is recirculated newsprint and the extrusion temperature 20° C. The indications used for the colloids are
koM = coldwater soluble oxidized corn starch Amijel M 5 from CPC,
P = native potato starch,
G = Guar gum, SuperCol U Powder from General Mills,
oM = Oxidized corn starch, Amisol 05594 from CPC,
M = Native corn starch,
CMC = Carboxymethylcellulose, Majol PS 6 from Uddeholm, Sweden,
PVA = Polyvinylalcohol, Covol 9930 from CPC,
PAA = Polyacrylamid, GR from W R Grace.

It can be seen, for instance, from FIG. 8 that at a fiber concentration of 16%, 7% corn starch is needed as colloid to completely bind the water. By increasing the amount of colloid the paste becomes less fluid and at 10% colloid the paste is so thick that the possibility of extrusion without particularly strong machinery may be doubted.

Native corn starch and pregelatinized corn starch gave the same curve M. For potato starch it appeared that the pregelatinized starch gave the two criterions at lower amounts than native starch and the tip of the angle indicating maximum possible fiber concentration moved a bit to the left. However, after vigorous agitation both viscosity and water binding returned to the values for native potato starch and only the curve for native potato starch has been drawn (diagram P in FIG. 7).

Figure 10:
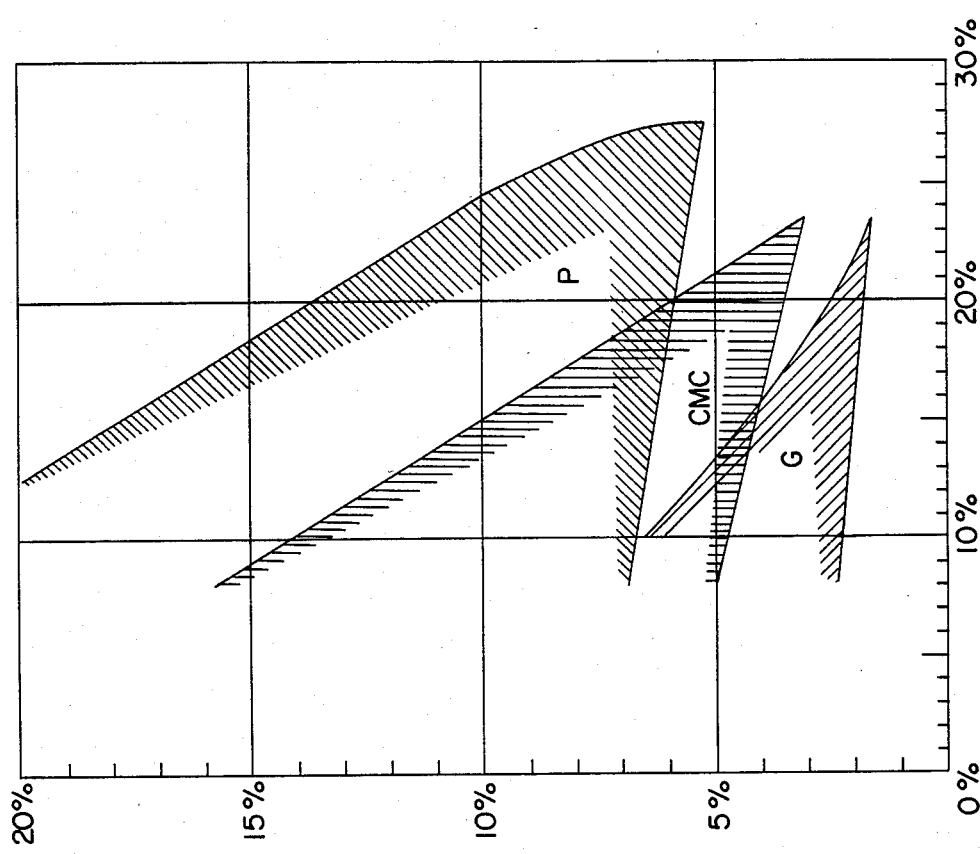
Figure 12:
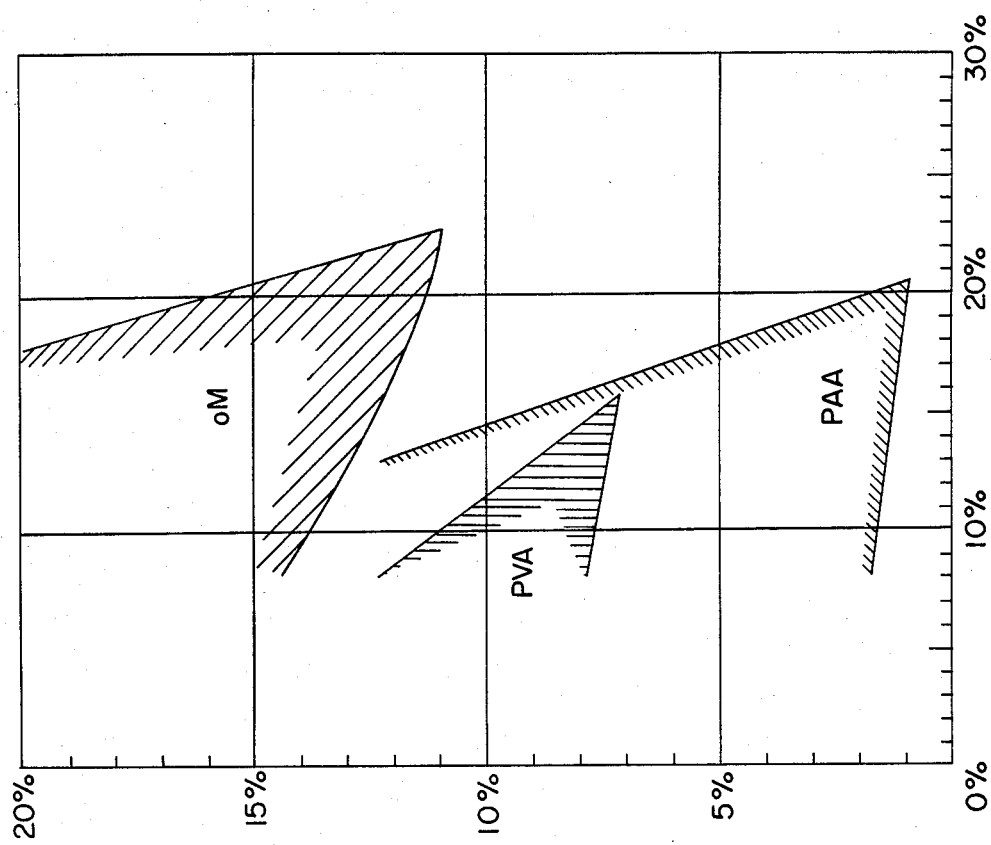
Figure 11:
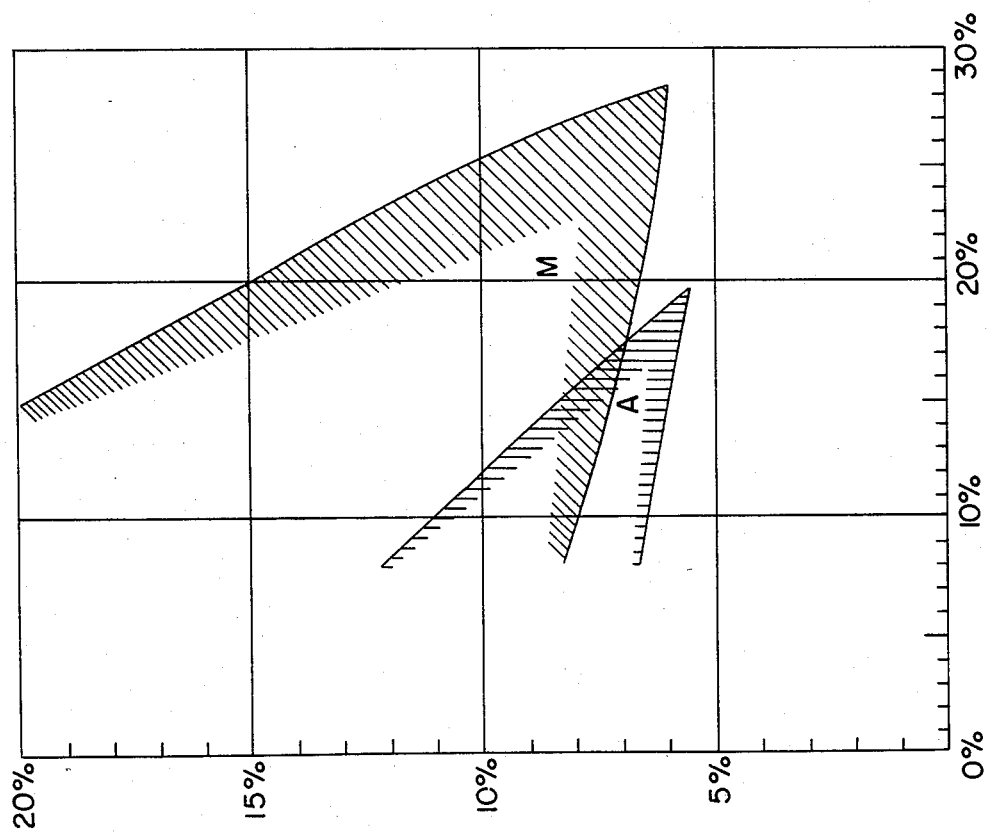

For the data shown in FIGS. 10–12 the fiber still is newsprint waste but the extrusion temperature was increased to 85° C. The colloids are
P = native potato starch, CMC=carboxymethylcellulose, Majol PS 6 from Uddeholm, Sweden,
G=guar gum, SuperCol U Powder from General Mills,
M=native corn starch,
A=alginate, Protanal H from Protan & Fagertun, Norway,
oM=oxidized corn starch, Amisol 05594 from CPC,
PVA=polyvinylalcohol, Covol 9930 from CPC,
PAA=polyacrylamid, GR 999 from W R Grace.

The tip of the angles indicates how high a fiber concentration it is possible to process according to the two chosen criterions. By comparing the curves for corn starch M on FIG. 8 and FIG. 11 it can be seen that the increase of extrusion temperature from 20° to 85° C. makes it possible to increase fiber concentration from 20 to 28%. The necessary colloid concentration at 85° C. and maximum fiber concentration is 6%, which means that the remaining quantity of water is 66%, or about 2 times the dry content.

Extrusions were also performed at higher temperatures than the 85° C. which is the maximum temperature used for the diagrams. With the equipment used it was, however, not posible to measure the criterions for minimum and maximum colloid because of vigorous steam development. An extrusion was carried out at 140° C. of a paste composed of 41% newsprint waste as fiber and 6% native potato starch as colloid, so that the ratio water to dry content was below 1½. The energy needed for drying may therefore by the present invention be reduced compared to traditional production of paper and paper board. The potato starch was added to the fiber dispersion without preceding cooking and therefore gelatinized by the aid of the heat immediately before being extruded. Extrusion through a 2 mm nozzle gave no difficulties. After passing through the nozzle the paste expanded by steam development into a filamentous network which after drying showed a specific gravity of 0.2 kg/dm$^3$ against 0.8 kg/dm$^3$ for normal extrusion at temperatures below 100° C.

Figure 13:
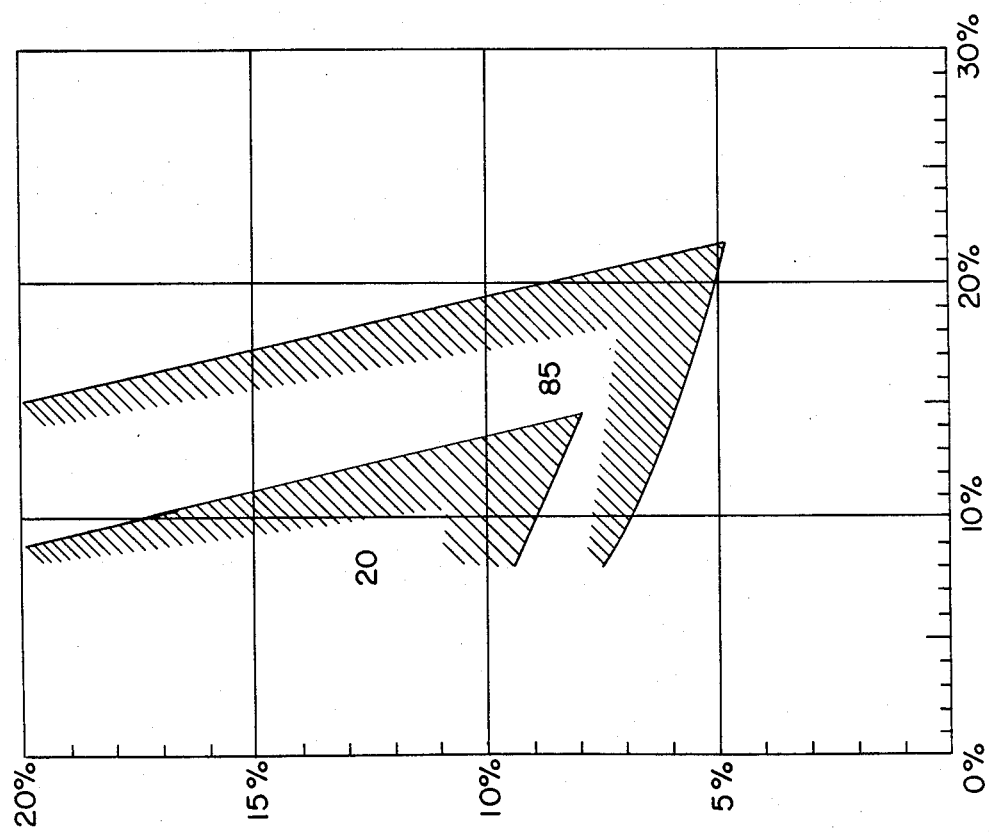

For the data shown in FIG. 13 the fibers still are newsprint waste, but instead of using a pure hydrocolloid ordinary wheat flour made at the yield of 78% was used. The extrusions were as usual made at 20° and 85° C. The diagrams show that the maximum possible fiber concentration is lower for wheat flour than for the starches.

Figure 14:
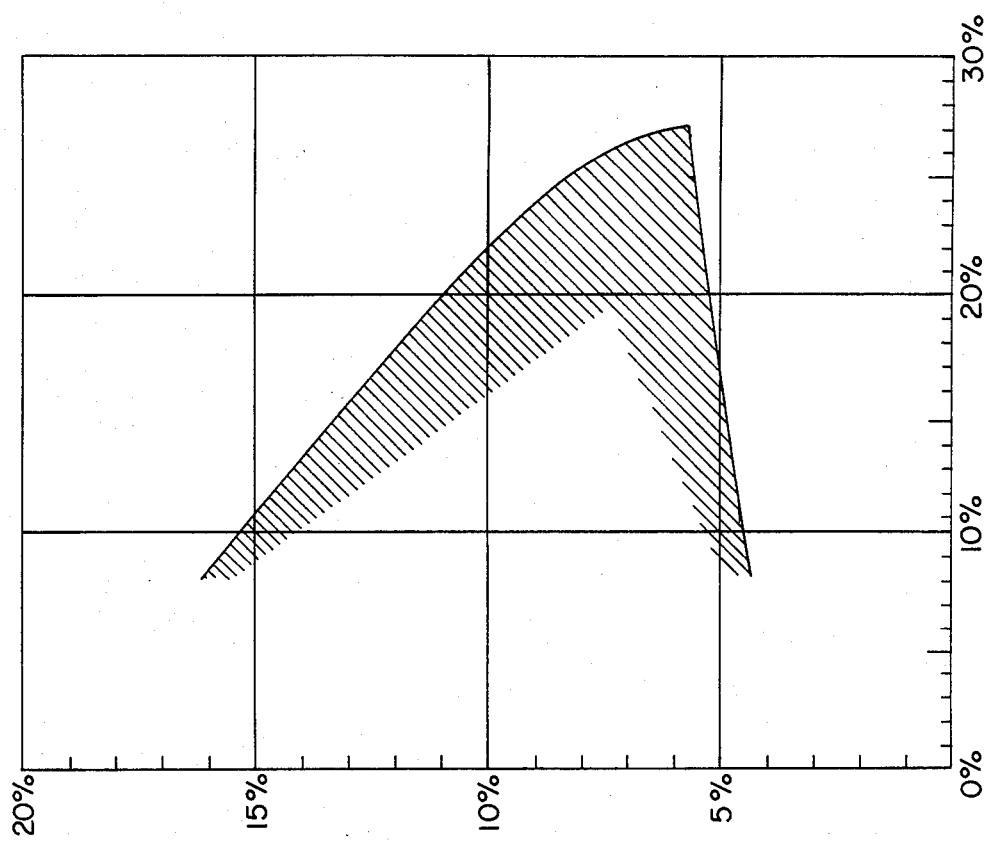

For the data shown in FIG. 14 the fiber is newsprint waste and the colloid native potato starch, but before measuring of the criterions 4% of a 50% styrene-butadien latex, DL 675 from Dow was incorporated. This diagram makes an exception to the other diagrams, because the amount of water is the difference between 98% and the sum of the concentrations of fiber and colloid. Whereas the amount of water at all other diagrams can be found as the difference up to 100%. The temperature was 20° C. By making a comparison with the diagram for potato starch on FIG. 7 it can be seen that the latex contributes to the water retention and also makes the paste more free-flowing, so that the lowest line moves downward and the point for maximum fiber concentration to the right.

Figure 15:
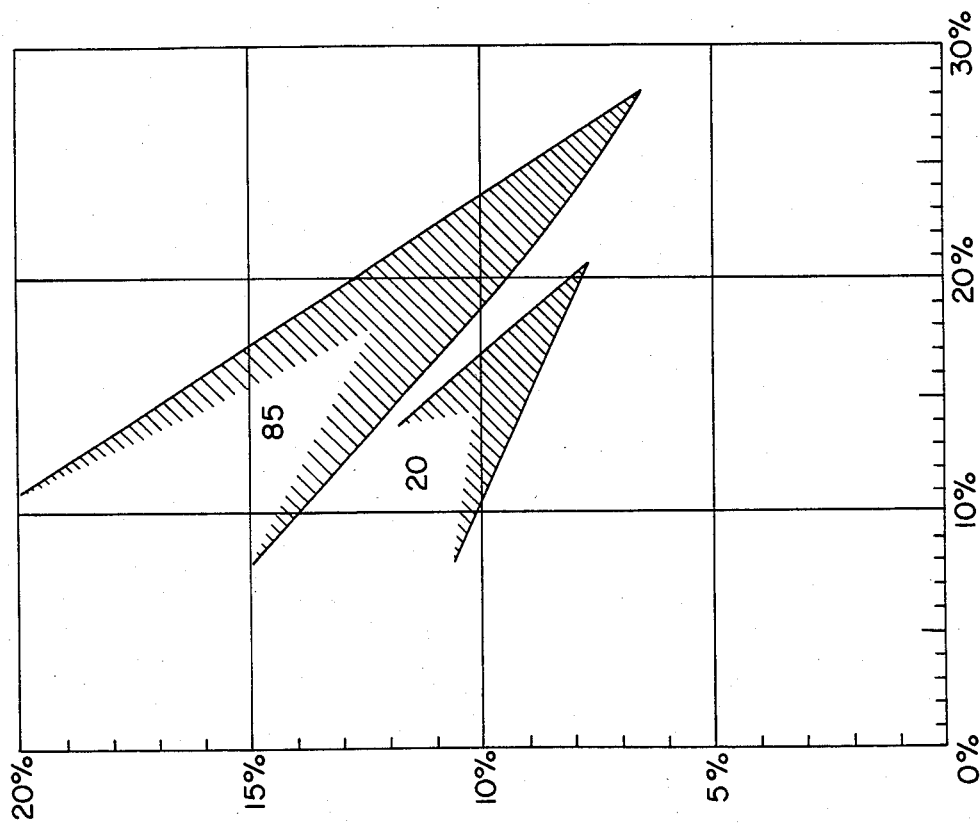

For the data shown in FIG. 15 the fiber is unbleached kraft waste from multiwall paperbags and the colloid is native corn starch. The extrusions were performed as usual at 20° and 85° C. The trials demonstrated that this fiber—sulphate pulp—because of lower waterbinding property and also greater tendency for flocculation needed more colloid than newsprint waste to fulfil the minimum criterion, so that the lowest line moves upwards on the diagram. This appears by comparing with the curves M on FIGS. 8 and 11.

Figure 16:
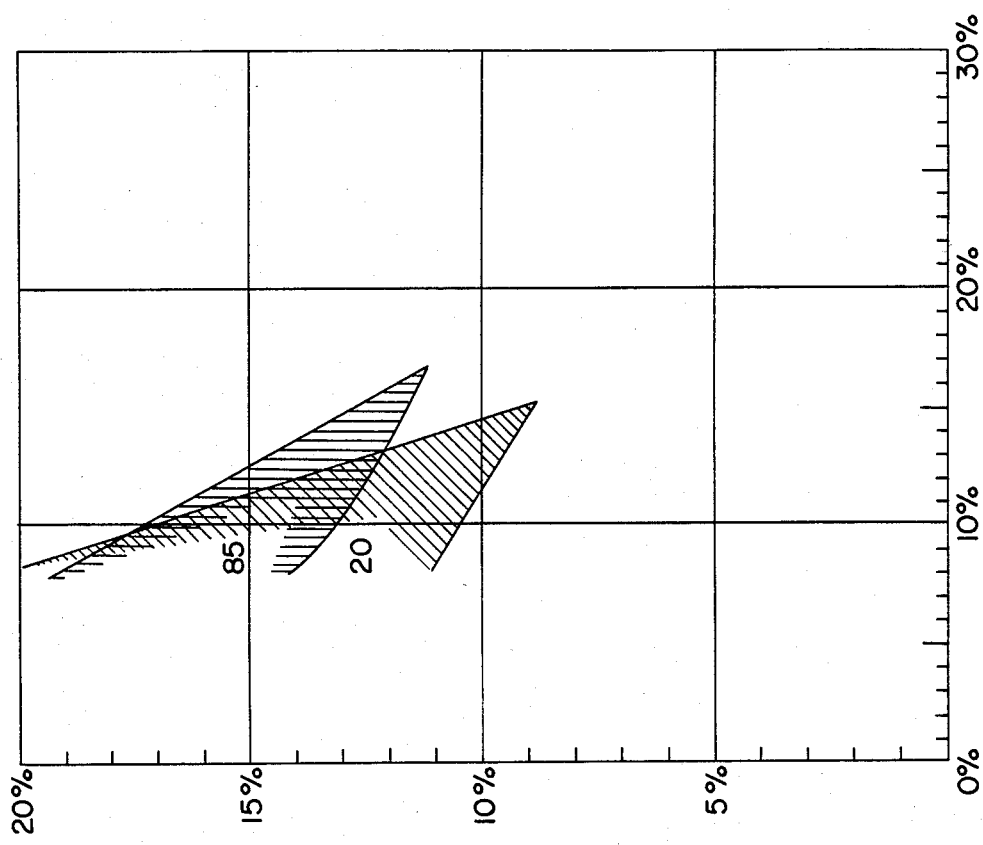

FIG. 16 illustrates the border lines by extrusions of mixtures of fiber from newsprint waste and casein as colloid. The casein which was used was Polish 30 mesh lactic casein. To improve the solubilization of the casein it was added as a dry mix of 53% casein, 10½% sodium-carbonate (Na$_2$CO$_3$) and 36½% moisture. When FIG. 16 was drawn the sodiumcarbonate was included as colloid.

Figure 17:
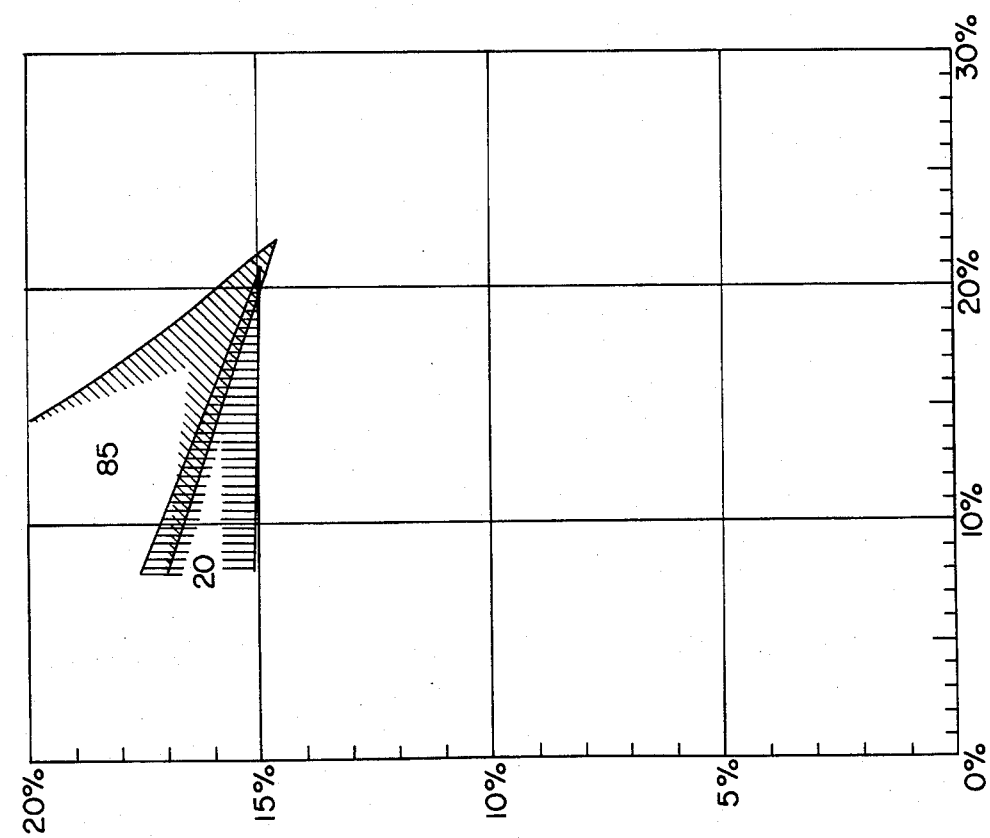

FIG. 17 illustrates the result of extrusions where native corn starch was used to make pastes from water dispersions of glass fiber.

Figure 18:
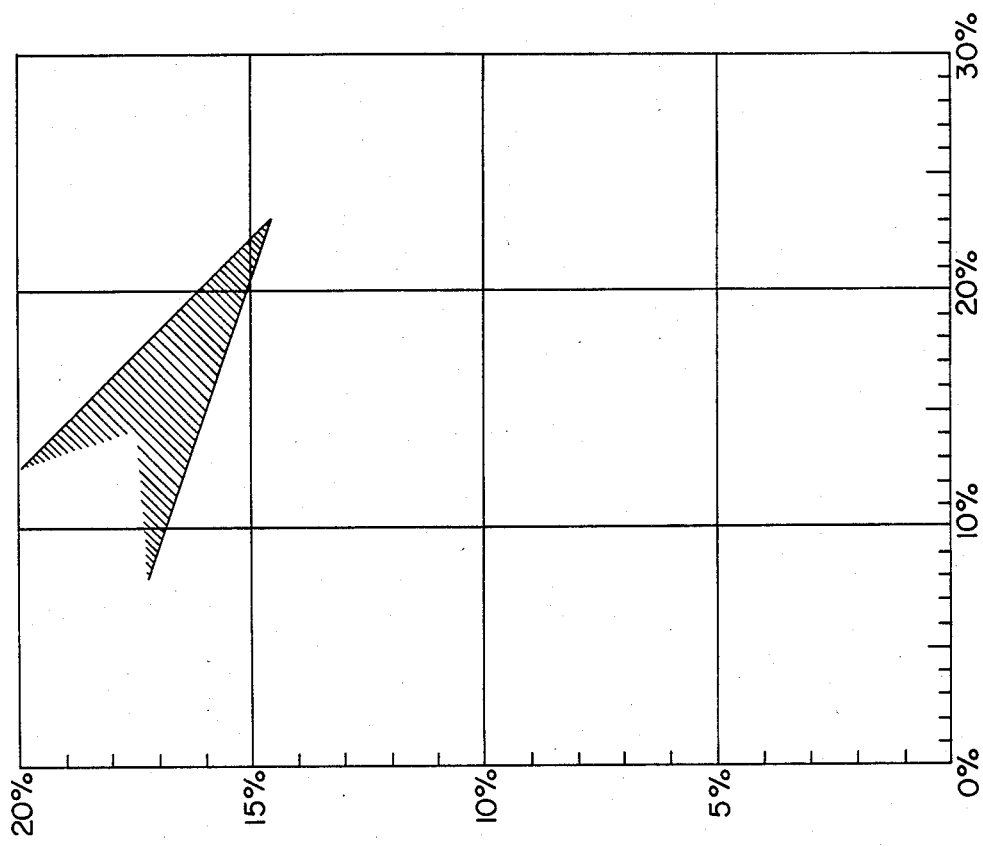

FIG. 18 illustrates that the invention is also applicable with synthetic fibers. The fiber used was polyamid perlon×400 weiss h matt dtex 2,2 dtex 6 mm from Bayer, Germany, and the hydrocolloid cold water soluble corn starch. For this fiber the curves at 20° and 85° C. were surprisingly close to each other and the curve on FIG. 18 was measured for both temperatures.

Figure 19:
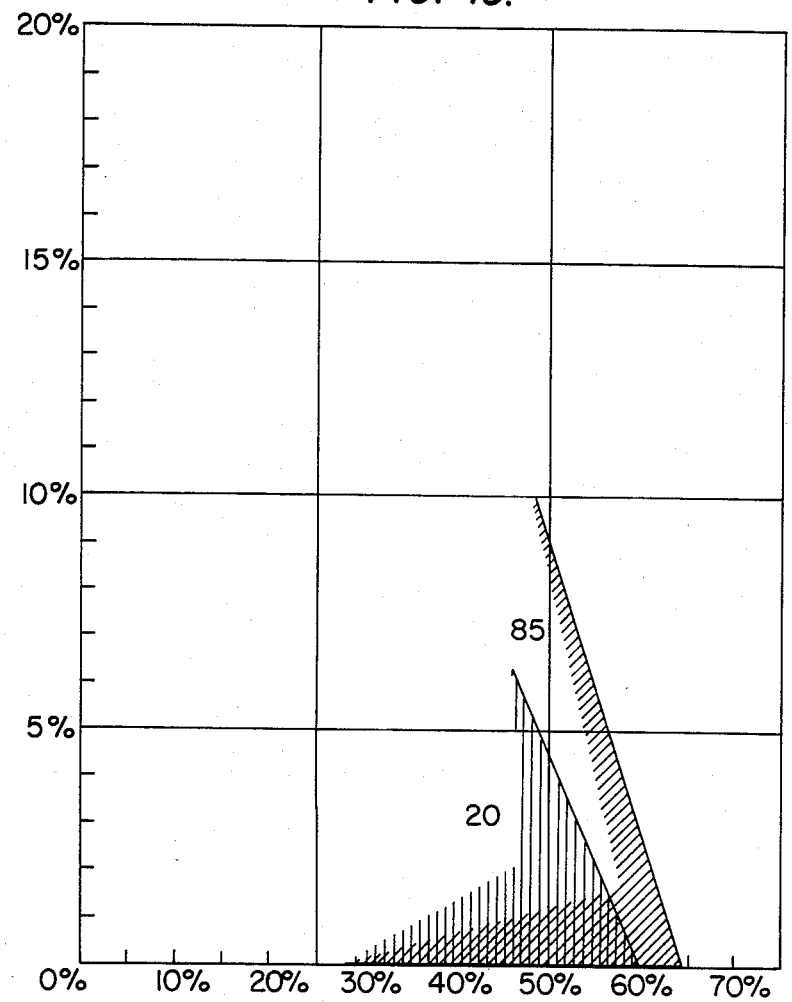

FIG. 19 illustrates experiments with finely ground coal dust, intended for foundries, and wheat flour. It was possible to use much higher concentrations than with fibers and at these high concentrations the water binding property of the coal dust was so good that the purpose of the wheat flour is more to give strength to the resulting briquettes.

Extrusions through the Haake-consistometer and all other formation were easiest to perform midway between the two criterions and not too close to the tip of the angle showing maximum dry content. Close to the line of the minimi-criterion and close to the tip for maximum dry content the paste and the ready products had a granulated appearance—less so for ground wood than for kraft pulp.

The amounts of fiber and colloid on the diagrams are as dry. Moisture added to the system together with the fiber and the colloid is calculated as water. The moisture content for all colloids other than starch and wheat, however, was so low that it has not been taken into consideration.

The methods used in coordinating the experiments are given below.

The fiber to be used was dissolved in warm water at 2% concentration and vigorous agitation. The produced pulp dispersion was dewatered through a wire with ¾ mm between the threads, and was thereafter pressed by hand to dry contents between 10 and 35%.

It appeared to be extremely important always to use the same temperature-time-lapse by preparaion and storage of the paste before measurement of the criterions as otherwise variations appeared in the results. Different method was used for warm water soluble and cold water soluble colloids:

Method for Warm Water Soluble Colloids

About 200 g fiberdispersion with colloid added in such an amount to try to "hit" the criterion looked for was placed in a closed jar of glass in an oven at 110° C. for 10 minutes. The temperature of the oven is then reduced to 95° C. at which temperature the sample is left for 30 minutes, after which the jar is opened and after a fast agitation the content is tested for viscosity and waterbinding at 85° C. The rest of the sample is left for a further 60 minutes in the closed jar—now at room temperature—whereafter the same two criterions are measured at 20° C. If the samples are left for longer periods of time than 60 minutes at room temperature lower water binding and higher viscosities were produced.

The diagrams for corn starch, oxidized corn starch, potato starch, wheat flour, polyvinylalcohol, alginate, CMC and guar are plotted in the diagram after measurement in this way even if the last mentioned 3 colloids really are cold water soluble, so that the method below also could have been used.

Method for Cold Water Soluble Colloids

Cold water soluble colloids are apt to give lumping by the addition to the fiber dispersion. To avoid plugging of the hole in the viscosimeter it was necessary to sprinkle the colloid very evenly, carefully and slowly onto the surface of the fiber dispersion when this is kept moving under vigorous kneading. 200 g samples were used also by this method. Measurement of viscosity and water binding at 20° C. was carried out immediately after addition of the colloid. The rest of the sample was left for 90 minutes in oven at 95° C. before measurement of the two criterions also at 95° C.

This method was used for cold water soluble corn starch, cold water soluble oxidized corn starch, cold water soluble potato starch, casein and polyacrylamid. If the method is used for CMC and guar about 1% more colloid is needed than by the "warm water soluble method" used for plotting the diagrams probably because the colloids are more completely soluble by the heating.

Finally some experience obtained from drying of the samples shall be reported.

If the drying is performed in an oven at 105° C. in such a way that 1 mm thick sheets of paste are placed to be dried on an untreated surface of iron some difficulties to loosen the samples from the iron surface after drying could occur. The experiments showed that loosening was easiest done when a high amount of colloid has been used and when the colloid chosen was efficient for binding of water i.e. to work in the area close to the maximum criterion of FIGS. 7–19.

If the samples instead were dried on a heated plate the problem of loosening was considerably reduced. By testing cross sections of the sheets it was possible to demonstrate a concentration of the hydrocolloid in the surface towards the heating plate. This confirms the above mentioned theory that loosening is easiest when there is a high amount of colloid.

The high amount of colloid in the surface to which the heat is added to the sample may be explained by migration of the colloid together with the water towards the hot surface where the water evaporates and the colloid is locked because it is not able to migrate back together with the steam.

If the drying is performed on a surface covered with teflon there is no problem at all to loosen the ready dried fibre products.

I claim:

1. A method of making a shaped cellulosic paper or paperboard article from a dilute aqueous suspension of cellulosic fibers, comprising the steps of:
   (a) diluting cellulosic fibers with water to form a dilute aqueous suspension of less than 10 percent by weight cellulosic fibers;
   (b) then agitating the dilute aqueous suspension of cellulosic fibers until the fibers become separated from each other and swollen;
   (c) then dewatering the aqueous suspension to obtain an aqueous suspension of at least 20 percent weight cellulosic fibers;
   (d) then preparing a homogenous, plastically formable material by adding to the suspension sufficient hydrocolloid to bind substantially all of the water in the material to prevent the water from bleeding out during subsequent shaping and to prevent the fibers from flocculating, and by kneading the material, said material containing water in the range of from about 50 to about 90 percent, fibers in the range of from about 8 to 49 percent, and hydrocolloid in the range of from about 1 to about 20 percent, by weight;
   (e) shaping the material into the desired shape by extrusion, injection molding, rolling, pressing or drawing, and
   (f) bonding the solids of the material by drying the shaped material.

2. A homogeneous, plastically formable material capable of being shaped into cellulosic paper or paperboard articles by extrusion, injection molding, coating, rolling, pressing or drawing without the water in the material bleeding out prepared by the method of claim 12.

* * * * *